Oct. 9, 1928.

G. N. HEIN

SYRINGE

Filed Oct. 4, 1926

1,687,091

INVENTOR.
George N. Hein.
BY
Townsend, Loftus & Abbett
ATTORNEYS.

Patented Oct. 9, 1928.

1,687,091

UNITED STATES PATENT OFFICE.

GEORGE N. HEIN, OF SAN FRANCISCO, CALIFORNIA.

SYRINGE.

Application filed October 4, 1926. Serial No. 139,244.

This invention relates to syringes, and more especially to a piston or plunger type of syringe.

The objects of this invention are:

First, to produce a piston packing that will automatically give a leakproof packing in bores of varying diameters;

Second, to produce a piston which, owing to its peculiar construction, can be easily entered into the bore of a syringe without injury to the packing;

Third, a piston which will act equally efficiently in both pressure and suction.

In carrying out this object, I provide a piston head or packing member which is of elastic and compressible material, having a thin section contacting with the surface which forms the sliding joint, and a relatively thick section exposed to the action of pressure or vacuum within the syringe, whereby compression of the thick section will create a tendency to expand the packing member in a direction to force the thin section into intimate contact with the surface over which it slides.

In the accompanying drawings.

Figure 1:
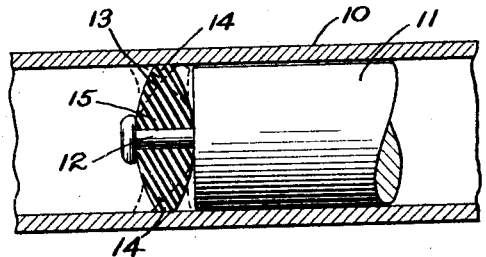
Fig. 1 shows a longitudinal central sectional view of a portion of a piston and barrel having a head or packing member embodying one form of my invention.

In general, the invention comprises a barrel 10, and a piston plunger 11, the latter having a stem 12 upon which an elastic and compressible head or packing member 13 is mounted. This head or packing member has a thin section 14 in contact with the walls of the cylinder, and a thickened section 15 adjacent the stem, with the front face thereof exposed to the pressure within the barrel. The rear face of the member 13 is spaced from the end of the plunger to leave a space 16.

Figure 2:
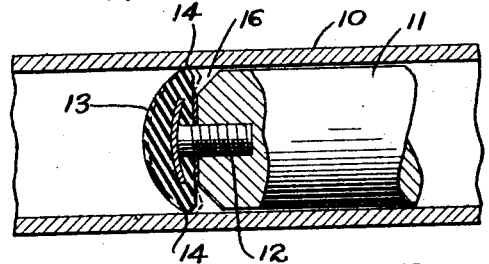
Fig. 2 and Fig. 3 show a modified form of piston head or packing member.
Figure 3:
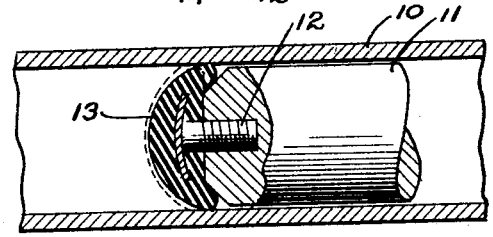
Figure 4:
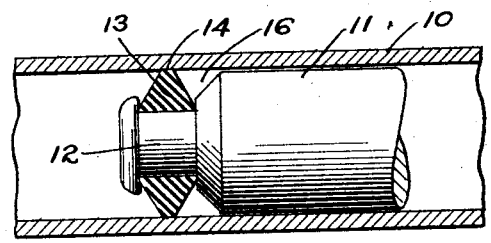
Fig. 4 shows a still further modification.

In Fig. 1 the piston head or packing member is convexo-convex in form; in the form of Figs. 2 and 3 it is generally hemispherical; and in Fig. 4, conical.

In the operation of the device, the pressure within the barrel will compress the thickened section of the head, thereby tending to enlarge its diameter so as to insure proper contact of the thin edge with the walls of the barrel. The contacting edge being attenuated, creates very little friction, and insures smooth operation. The space 16 back of the head allows the latter to be deflected as shown in dotted lines in Fig. 1, so as to prevent too much friction between the head and barrel. The force acting to expand the head and the force acting to deflect it will be balanced, and thus an ideal condition is maintained at the sliding joint.

On the suction stroke the vacuum on the back side of the piston head will tend to compress the thickened section, thus enlarging the diameter of the head and deflecting the thin edge, as shown in dotted lines to the left of Fig. 1.

As indicated in Figs. 2 and 3, the same size head will function in barrels varying considerably in diameter. In either case a thin edge contact is formed between the head and barrel, so that excessive friction is avoided.

Figure 5:
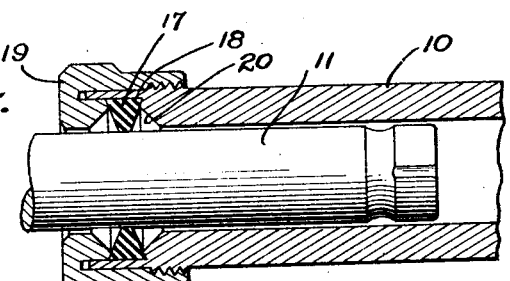
Fig. 5 shows a central longitudinal sectional view of a modified form, wherein the packing member is in the form of a throat-washer carried by the cylinder or barrel, and has a thin edge contacting with a sliding plunger.

In Fig. 5 the packing member is on the barrel and is in the form of a throat-washer 17, concavo-concave in form, with its perimeter held in place in a groove 18 on the barrel by means of a nut 19. The thin edge contacts with the plunger 11, and the end of the barrel is beveled as shown at 20, so that pressure within will tend to compress the washer 17. The periphery of the washer being defined by the barrel, it results that the compression of the walls of the washer will cause the thin edge to expand radially in the direction of the plunger, so as to bring about a condition substantially like that illustrated in the other forms.

It will be seen from the foregoing that I have provided a piston head or packing member capable of automatically adjusting itself to larger or smaller diameters without producing excessive friction. It maintains a line or thin edge contact at all times at the sliding joint, but acts as well on suction as on ejection. Being compressible and elastic, the packing member or head can easily be inserted within the barrel without danger of injury. Such a piston is ideally suited for use in connection with glass barrel syringes.

Having thus described my invention, what I claim as new and desire to secure by Letters Patent is:

1. In a syringe of the piston type, a packing member between the plunger and barrel, comprising an elastic and compressible member having a thin, flat section contacting with the surface of one of said elements to form a sliding joint, and a relatively thick section exposed to pressure within the barrel, whereby there will be a tendency to compress the packing member axially, resulting in a corresponding expansion radially, said packing member being free to be deflected sufficiently to cause a corner of the thin, flat section to engage the co-operating surface.

2. In a syringe of the piston type, a packing for the piston comprising an elastic and compressible member having a thin flat section for contact with the surrounding barrel and a thickened section exposed to pressure within the barrel, whereby there will be a tendency to compress the packing member axially, resulting in an expansion radially, said packing member being free to be deflected sufficiently to cause a corner of the thin, flat section to engage the co-operating surface.

3. In a syringe of the piston type, a plunger, a head carried on the plunger and formed of elastic and compressible material, said head having a thin flat section contacting with the surrounding barrel and a thickened section exposed on opposite sides to the action of pressure and suction within the barrel, whereby pressure conditions within the barrel will act to compress the head axially, resulting in an expansion radially of said head, said packing member being free to be deflected so that a corner of the thin, flat section will engage the barrel.

GEORGE N. HEIN.